United States Patent [19]

Melzer et al.

[11] Patent Number: 4,619,777
[45] Date of Patent: Oct. 28, 1986

[54] PREPARATION OF A MAGNETIC DISPERSION

[75] Inventors: Milena Melzer, Ludwigshafen; Helmut Jakusch, Frankenthal; Werner Graü, Bobenheim-Roxheim; Eberhard Köster, Frankenthal; Werner Löser, Ludwigshafen; Reinhard Polke, Mutterstadt; Günter Schädel, Mannheim; Manfred Ohlinger, Frankenthal; Günter Väth, Limburgerhof, all of Fed. Rep. of Germany

[73] Assignee: BASF Aktiengesellschaft, Ludwigshafen, Fed. Rep. of Germany

[21] Appl. No.: 491,718

[22] Filed: May 5, 1983

[30] Foreign Application Priority Data

May 7, 1982 [DE] Fed. Rep. of Germany ....... 3217099

[51] Int. Cl.$^4$ .......................... H01F 1/26; C04B 35/04
[52] U.S. Cl. ............................... 252/62.54; 252/62.53; 427/48; 427/128; 428/323; 428/328; 428/329; 428/695; 428/900
[58] Field of Search .......................... 252/62.54, 62.53

[56] References Cited

U.S. PATENT DOCUMENTS 4,267,203  5/1981  Motz et al. ........................ 252/62.54
4,308,155 12/1981  Tada et al. ........................ 252/62.54
4,474,848 10/1984  Yamaguchi ....................... 252/62.54

FOREIGN PATENT DOCUMENTS 2311588 12/1976 France .

OTHER PUBLICATIONS

Perry Chemical Engineer's Handbook 5th Ed. 1976, pp. 43 to 44.
Defazetaktuell 26th Year, No. 5, 1972, pp. 255–259.

Primary Examiner—Arthur P. Demers
Attorney, Agent, or Firm—Keil & Weinkauf

[57] ABSTRACT

A magnetic dispersion which can be applied to a non-magnetic base to produce a recording medium is prepared by dispersing a magnetically anisotropic material in a polymer binder and in an organic solvent by a method wherein the magnetically anisotropic material is worked in a jet mill before and/or during dispersing.

8 Claims, No Drawings

PREPARATION OF A MAGNETIC DISPERSION

The present invention relates to a process for the preparation of a magnetic dispersion for magnetic recording media, in which a magnetically anisotropic material is dispersed in a polymer binder and in an organic solvent.

Processes for the preparation of recording media having a maximum output level at short wavelengths are sufficiently well known. They very often relate to the preparation of the magnetic pigments themselves (for example the crystal growth of the starting materials α-, β- or γ-FeOOH in the case of γ-iron(III) oxide), which are defined in terms of needle length and thickness, particle size spectrum and specific surface area. In a number of other processes, non-magnetic iron oxide hydroxide modifications are converted to ferrimagnetic iron(III) oxide while the shape of the particles is substantially preserved. Other processes entail, for example, the application of a cobalt ferrite coating onto ferrimagnetic iron(III) oxide to achieve higher coercive force, and the preparation of chromium dioxide or of acicular metal pigments.

Both the hydrothermal preparation procedure and the subsequent working up give aggregates or agglomerates having very different particle diameters. In some cases, these aggregates or agglomerates are also formed during drying of the pigment suspension or paste after a downstream finishing process, the acicular particles being dendritically branched and partially sintered, depending on the procedure used to obtain them.

In a layer of a recording medium, these magnetic pigments should preferably be present as individual needles equally spaced in the direction of preferred magnetization, the intermediate spaces being filled with binder and dispersing assistants and containing very few air pockets. In accordance with these requirements, dispersing should be carried out in a gentle manner, i.e. in a pot-type ball mill, a stirred mill or a continuous tube mill or by milling in the kettle so that, substantially, the aggregates or agglomerates are destroyed without the individual needles being broken.

In conventional processes, the magnetic pigments, after their preparation, are worked in an impact disc mill, a hammer mill or a toothed disc mill, and the aggregates or agglomerates formed during preparation of the pigment are divided.

The disadvantages of these milling methods are the low bulk density of $\leq 0.5$ g/cm$^3$ and the high proportion of very fine particles, which leads to difficulties in wetting and hence to the need for a particularly large amount of solvent when the material is processed to a dispersion; a further disadvantage is the fact that the pigment structure is damaged, since some of the individual pigment needles are broken before complete division of the aggregates and agglomerates is achieved.

A conventional process for increasing the bulk density of the magnetic pigment comprises compacting in a roll mill, a bulk density of about 0.7 g/cm$^3$ being achieved. This method is said to give an improved particle structure and at the same time to achieve compacting of the fine particles; however, some of the acicular particles are also broken during this procedure, so that the field strength distribution of the pigment and hence the magnetic properties of the recording medium produced from this pigment are adversely affected. Moreover, the particle size spectrum is not very uniform, and pigments prepared in this manner are hence expensive to convert to dispersions.

It is well known that organic or inorganic colored pigments can be processed by working in a jet mill. However, these pigments consist of isotropic individual particles which are spherical in most cases.

The specialist industrial publication defazetaktuell, 26th year, No. 5, 1972, pages 255–259, describes a procedure in which cubic iron oxide pigments are micronized with the aid of a jet mill in order to achieve better quality and rationalization in the production of surface coatings. Superheated steam under 15 atm gauge pressure and at about 200° C. flows tangentially into a milling chamber and sets the pigment into circular motion. Collision of the particles causes division and hence destruction of relatively large agglomerates, and this is seen as a decisive advantage of the micronization of cubic pigments. The effect on the particle size distribution is said to be small; on the other hand, it is stated that acicular pigment particles are broken.

Hitherto, it has not been thought possible that acicular, anisotropic pigments could be worked in a jet mill, since this procedure was expected to destroy the acicular structure.

It is an object of the present invention to provide a process for the preparation of a dispersion containing an acicular, magnetically anisotropic pigment, wherein agglomerates are very substantially divided without the acicular particles being destroyed, and these particles possess a more uniform size spectrum and are more readily dispersible than hitherto.

We have found that this object is achieved by a process for the preparation of a magnetic dispersion for magnetic recording media, in which a magnetically anisotropic material is dispersed in a polymer binder and in an organic solvent, wherein the magnetically anisotropic material is worked in a jet mill. In this procedure, the magnetically anisotropic material can be worked in the jet mill together with the dispersant, the binder and other assistants, e.g. a lubricant.

Furthermore, the magnetically anisotropic material can be subjected to jet milling during its preparation process and at the stage of its intermediate, if appropriate together with coating agents and/or doping materials. It is advantageous if the jet pressure during milling is from 2 to 8 bar, and if the magnetically anisotropic material, after it has been worked in the jet mill, is pelletized in order to increase its bulk density.

In the jet milling procedure, a grinding medium is not added, and milling is effected instead by means of the carrier gas-laden pigment itself. By varying the milling conditions, for example the ratio of solid to gas, the throughput per time unit and the initial pressure of the gas, and depending on the mill construction, it is possible to achieve optimum conditions such that a narrow spectrum of primary particles with small agglomerates is obtained, without the primary particles themselves being destroyed. The distribution spectrum can be determined by sieve analysis employing the air-jet principle, while comparison of the field strength distribution before and after milling can be used to show that the pigment has been substantially protected from destruction during milling.

Working in a jet mill replaces the conventional procedure comprising milling, and compacting in a roll mill. The magnetic pigment can be milled alone, i.e. in the absence of additives; however, it is advantageous for the dispersing process and for the recording medium prepared from the resulting dispersion if the pigment is milled together with dispersants or even with dispersants and binders. The additives which are milled together with the magnetic pigment can be either solid or liquid. If these additives are components of the magnetic dispersion, e.g. dispersants and binders, it is possible to produce a predispersion by working in a jet mill, so that the dispersion time in the subsequently employed conventional dispersing apparatus can be substantially reduced. Moreover, when the binder is worked together with the pigment in a jet mill, it is not necessary to prepare a binder solution.

We have also found that the coercive force of pigments subjected to jet milling is substantially higher than that of pigments obtained by conventional methods. The field strength distribution is also more advantageous, and this has a particularly positive effect on the recording properties of media for use at short wavelengths. This procedure produces a substantial reduction in the proportion of very fine particles (these being undesirable), and hence leads to an improved signal to print-through ratio.

Further advantages of jet-milled magnetic pigments include ease of wetting with solvents and a substantial reduction in the amount of solvent in the dispersion batch. As a result, it is possible to prepare dispersions with a lower solvent content than has been obtainable in the case of pigments obtained by a conventional process; this has an advantageous effect on the structure of the magnetic layer (lower porosity) and hence on the recording properties.

The low bulk density of the magnetic pigments which is obtainable by working in a jet mill (for example <0.3 $g/cm^3$ in the case of $\gamma$-$Fe_2O_3$ pigments) surprisingly proves to be no obstacle to achieving good wetting with the solvent; instead, the wettability is better and the amount of solvent required is substantially lower than in the case of a magnetic pigment obtained by a conventional process, for example compacted in a roll mill, and having a bulk density of 0.7 $g/cm^3$.

Further advantages include the lower proportion of coarse particles in the dispersion batch (referred to as a slurry by those skilled in the art) and the resulting improved pumpability compared with magnetic pigments prepared by a conventional process.

In some cases, for example for reasons of transport, the low bulk density of the magnetic pigment, as obtained by jet milling, can be disadvantageous. In such a case, a pelletizing procedure can be used to increase the bulk density to the desired level, for example to 0.5-0.7 $g/cm^3$ in the case of $\gamma Fe_2O_3$, while the improvements in the magnetic pigment and in the recording medium produced therefrom, which have been achieved by jet milling, are completely retained.

Jet milling is also advantageous when $\gamma$-$Fe_2O_3$ ($Fe_3O_4$) is predispersed for subsequent Co or Sn doping, because it is important that, in the doping procedure, the acicular particles, and not the agglomerates or aggregates, are coated in order to obtain products having a high coercive force and a narrow field strength distribution.

It is also advantageous if jet milling of a metal pigment is carried out in conjunction with passivation in a nitrogen/air mixture or with other passivators. In this manner, it is possible to effect subsequent passivation of pigment particles which have broken off or of oxide coatings which have split open, or to separate off finely divided oxide rubbings.

Good results are also obtained when the intermediates in the preparation of the magnetic pigment are subjected to jet milling, e.g. acicular $\gamma$-FeOOH before its conversion.

The Examples which follow illustrate the above process.

EXAMPLE 1

Working the Magnetic Pigment in a Jet Mill, in the Absence of Additives

A $\gamma$-iron oxide pigment which has a specific surface area of 18 $m^2/g$ and a coercive force of 27.9 kA/m, is in the form of granules of irregular shape and size, as obtained after the preparation of the pigment, and has a bulk density of 0.45 $g/cm^3$ is worked in a jet mill of 170 mm diameter, at a throughput of 8 kg/hour and under a jet pressure of 3.5 bar, using nitrogen. The resulting pigment is then processed as follows:

900 g of this $\gamma$-iron oxide pigment obtained by jet milling, 22.5 g of a commercial dispersant comprising a 50% strength solution of a salt of a long-chain polyamineamide and a high molecular weight acidic ester in toluene, and 794 g of a solvent mixture containing equal parts of tetrahydrofuran and dioxane, and 300 g of a 20% strength solution of an 80:10:10 copolymer of vinyl chloride, dimethyl maleate and diethyl maleate, having a K value of 60, in the above solvent mixture are introduced into a steel ball mill which has a capacity of 6 liters and contains 8 kg of steel balls of 4-6 mm diameter, and dispersing is carried out for 24 hours. Thereafter, 91 g of the above solution of the vinyl chloride/dimethyl maleate/diethyl maleate copolymer, 852 g of a 13% strength solution of a polyester-polyurethane, which has a K value of 60 and has been prepared from a polyester of butanediol with adipic acid, butanediol, trimethylolpropane and diphenylmethane diisocyanate, in a mixture of equal parts of tetrahydrofuran and dioxane, and 12.6 g of a conventional lubricant are added, and dispersing is continued for a further 2 hours.

The resulting dispersion is passed under pressure through a filter with 5 $\mu$m pores, and is applied onto a 12 $\mu$m thick polyethylene terephthalate film by means of a conventional coater. The coated film is passed through a magnetic field in order to orient the magnetic particles, and is then dried at from 50° to 90° C. After drying, the magnetic layer is compacted and calendered by passing it, under a net pressure of 200 kp/cm, between rollers heated at 70° C., so that the thickness of the resulting magnetic layer is 4.5 $\mu$m. The material is then slit into 3.81 mm wide tapes for audio use. The magnetic properties are measured in a magnetic field of 100 kA/m. The electroacoustic properties are tested in accordance with DIN 45,401, DIN 45,403 and DIN 45,512, sheet 12, with reference to the standard tape IEC 1.

The properties of the pigment and of the tape are shown in the Table.

EXAMPLE 2

Mixing the Magnetic Pigment with a Dispersant in a Jet Mixer $\gamma$-Iron oxide which has a specific surface area of 18 $m^2/g$ and a coercive force of 27.9 kA/m and is in the form of granules of irregular shape and size, as obtained after the pigment preparation, is premixed with a dispersant comprising a 50% strength solution of a salt of a long-chain polyamineamide and a high molecular weight acidic ester in toluene, the procedure being carried out in a paddle mixer and the weight ratio of pigment to dispersant being 100:2.5. The resulting mixture is worked in a jet mill of 170 mm diameter, at a throughput of 8 kg/hour and under a jet pressure of 5 bar, using nitrogen.

The pigment which has been subjected to jet milling together with a dispersant is processed as follows:

922 g of this pigment/dispersant mixture, 794 g of a solvent mixture comprising equal parts of tetrahydrofuran and dioxane, and 300 g of a 20% strength solution of an 80:10:10 copolymer of vinyl chloride, dimethyl maleate and diethyl maleate, which has a K value of 60, in the above solvent mixture, are introduced into a steel ball mill which has a capacity of 6 liters and contains 8 kg of steel balls of 4–6 mm diameter, and dispersing is carried out for 24 hours. Thereafter, 91 g of the above solution of the vinyl chloride/dimethyl maleate/diethyl maleate copolymer, 852 g of a 13% strength solution of a polyester-polyurethane, which has a K value of 60 and has been prepared from a polyester of butanediol with adipic acid, butanediol, trimethylolpropane and diphenylmethane diisocyanate, in a mixture of equal parts of tetrahydrofuran and dioxane, and 12.6 g of a conventional lubricant are added, and dispersing is continued for a further 2 hours.

The resulting dispersion is processed as described in Example 1 to give an audio tape, and the magnetic and electroacoustic properties of this tape are measured as described in that example.

The properties of the pigment subjected to jet milling with the dispersant, and of the tape produced therefrom, are shown in the Table.

EXAMPLE 3

Mixing the Magnetic Pigment with a Dispersant in a Jet Mixer, and Subsequent Pelletizing of the Product The pigment subjected to jet milling with a dispersant, as described in Example 2, is then compacted by a pelletizing procedure, its bulk density increasing from an initial value of 0.19 g/m$^3$ to 0.50 g/m$^3$. This degree of compacting is achieved in the course of 2 hours, in a drum-like vessel which has a capacity of 250 ml and a diameter of 8 cm, rotates at 20 rpm and is filled to 50% of its volume with the jet-milled mixture of the magnetic pigment with a dispersant.

The resulting compacted pigment is likewise processed to give an audio tape, and its properties are measured.

The properties of the pigment subjected to jet milling with a dispersant and then compacted by pelletizing, and the properties of the tape produced from this pigment, are shown in the Table.

EXAMPLE 4

Working the Magnetic Pigment in a Jet Mill Together with a Dispersant and a Binder An 80:10:10 copolymer of vinyl chloride, dimethyl maleate and diethyl maleate, which has a K value of 60, is first comminuted and then worked in a jet mill with a milling chamber of 170 mm diameter, at a throughput of 2 kg/hour and under a jet pressure of 8 bar, milling being carried out under nitrogen.

γ-Iron oxide which has a specific surface area of 18 m$^2$/g and a coercive force of 27.9 kA/m and is in the form of irregular granules, as obtained after the pigment preparation, is premixed with a dispersant comprising a 50% strength solution of a salt of a long-chain polyamineamide and a high molecular weight acidic ester in toluene, the procedure being carried out in a paddle mixer and the weight ratio of pigment to dispersant being 100:2.5. The above mixture of magnetic pigment and dispersant and the above pre-milled copolymer are each introduced via a metering screw into a jet mill which has a milling chamber of 170 mm diameter and is equipped with two metering screws. The weight ratio of pigment with dispersant to copolymer is 102.5:8.7. Milling is carried out at a throughput of 8 kg/hour, under a jet pressure of 5 bar and under nitrogen.

This jet-milled mixture is processed as follows:

1,000 g of this jet-milled mixture and 1,107 g of a solvent mixture comprising equal parts of tetrahydrofuran and dioxane are introduced into a steel ball mill which has a capacity of 6 liters and contains 8 kg of steel balls of 4–6 mm diameter, and dispersing is carried out for 24 hours. Thereafter, 852 g of a 13% strength solution of a polyester-polyurethane, which has a K value of 60 and has been prepared from a polyester of butanediol with adipic acid, butanediol, trimethylolpropane and diphenylmethane diisocyanate, in a mixture of equal parts of tetrahydrofuran and dioxane, and 12.6 g of a conventional lubricant are added, and dispersing is continued for 2 hours.

The resulting dispersion is once again processed to give an audio tape, and the magnetic and electroacoustic properties of this tape are measured.

The results are summarized in the Table.

EXAMPLE 5

Processing the Magnetic Pigment Which Has Been Compacted in a Roll Mill

For comparison, a magnetic pigment which has not been subjected to jet milling and has been compacted in a roll mill by a conventional method until the bulk density is 0.7 g/cm$^3$ is processed to give an audio tape in the same manner, with the exception that, in the preparation of the dispersion, 894 g of a solvent mixture comprising equal parts of tetrahydrofuran and dioxane have to be used for 900 g of the above, compacted γ-Fe$_2$O$_3$ pigment in order to obtain the rheological properties suitable for producing a dispersion. A dispersion time of 48 hours is required in this case in order to achieve the same degree of fineness, assessed microscopically, as that obtained in the case of the jet-milled pigment. The properties of the pigment compacted in a roll mill, and those of the tape produced from this pigment, are likewise shown in the Table.

TABLE

| | Working the magnetic pigment in a jet mill | | | | |
| --- | --- | --- | --- | --- | --- |
| | Examples with γ-Fe$_2$O$_3$ | | | | |
| | 1 | 2 | 3 | 4 | 5 |
| Magnetic pigment powder properties | | | | | |
| Coercive force (kA/m) | 26.5 | 26.7 | 26.6 | 26.7 | 25.7 |
| Field strength distribution$^{(+)}$ | 0.54 | 0.52 | 0.53 | 0.52 | 0.57 |
| Bulk density (/cm$^3$) | 0.18 | 0.19 | 0.55 | 0.20 | 0.72 |

TABLE-continued

Working the magnetic pigment in a jet mill

| | Examples with $\gamma\text{-}Fe_2O_3$ | | | | |
|---|---|---|---|---|---|
| | 1 | 2 | 3 | 4 | 5 |
| Coarse particles in the slurry, according to the grindometer test | 15 μm | 15 μm | 15 μm | 15 μm | >100 μm |
| Tape properties | | | | | |
| Magnetic properties: | | | | | |
| Coercive force (ka/m) | 26.0 | 26.2 | 26.0 | 26.2 | 25.0 |
| Residual magnetization (mT) | 175 | 178 | 178 | 180 | 175 |
| Relative remanence | 0.87 | 0.88 | 0.88 | 0.89 | 0.86 |
| Orientation ratio | 3.0 | 3.2 | 3.1 | 3.2 | 2.9 |
| Electroacoustic properties (Standard tape IEC 1) | | | | | |
| Maximum output level at short wavelengths 10 khz (Δ dB) | ±0 | +0.5 | +0.3 | +0.5 | −1.0 |
| Signal to print-through ratio (Δ db) | +1.0 | +1.5 | +1.0 | +1.5 | −1.0 |

(+) The field strength distribution is a measure of the magnetic uniformity of the particles. It is determined from the D.C. demagnetization curve (residual induction curve), as $\frac{\Delta H}{H_R}$ where $\Delta H$ is the field difference at which 75% or 25% of the particles change over, $H_R$ and $H_R$ is the remanence coercivity.

From a comparison of Examples 1, 2, 3, 4 and 5, it can be seen that the jet-milled pigments are superior to those obtained by a conventional process and compacted in a roll mill. In addition to technological advantages, such as lower solvent requirement and consequent savings in solvent, lower proportion of coarse particles in the slurry and shorter dispersing time, there are also substantial advantages in respect of higher coercive force and field strength distribution of the pigment, and, accordingly, higher coercive force, relative remanence, maximum output level at short wavelengths, and signal to print-through ratio of the tape, other properties not mentioned here being equal.

We claim:

1. A process for the preparation of a magnetic dispersion for magnetic recording media, in which a magnetically anisotropic material is dispersed in a polymer binder and in an organic solvent wherein the magnetically anisotropic material is worked in a jet mill by means of a jet of gas resulting in the jet milled magnetically anisotropic material being of a dry nature.

2. A process as claimed in claim 1, wherein the magnetically anisotropic material is worked in a jet mill together with the dispersant.

3. A process as claimed in claim 1, wherein the magnetically anisotropic material is worked in a jet mill together with the dispersant and the binder.

4. A process as claimed in claim 1, wherein the magnetically anisotropic material is worked in a jet mill together with the dispersant, the binder and other assistants, such as lubricants.

5. A process as claimed in claim 1, wherein the magnetically anisotropic material is subjected to jet milling during its preparation process and at the stage of its intermediate.

6. A process as claimed in claim 5, wherein the magnetically anisotropic material is subjected to jet milling during its preparation and at the stage of its intermediate, the material being milled together with coating agents and/or doping materials.

7. A process as claimed in claim 1, wherein the jet pressure during milling is from 2 to 8 bar.

8. A process as claimed in claim 1, wherein the magnetically anisotropic material, after being worked in a jet mill, is pelletized in order to increase its bulk density.

* * * * *